United States Patent [19]

Kuniyoshi et al.

[11] 4,012,774
[45] Mar. 15, 1977

[54] DROP-OUT RESPONSIVE COLOR VIDEO REPRODUCING APPARATUS

[75] Inventors: Yasunobu Kuniyoshi, Tokyo; Hisaaki Narahara, Musashino; Takao Tsuchiya, Fujisawa, all of Japan

[73] Assignee: Sony Corporation, Tokyo, Japan

[22] Filed: Feb. 18, 1976

[21] Appl. No.: 659,009

[30] Foreign Application Priority Data

Feb. 20, 1975 Japan .......................... 50-21264

[52] U.S. Cl. ..................................... 358/8; 360/38
[51] Int. Cl.² ........................................ H04N 5/76
[58] Field of Search ............ 358/8, 4; 178/6.6 DC; 360/38

[56] References Cited

UNITED STATES PATENTS

| 3,803,347 | 4/1974 | Van Den Bussche | 358/8 |
| 3,974,519 | 8/1976 | Van Den Bussche | 358/8 |
| 3,974,520 | 8/1976 | Kuroyanagi | 358/8 X |

Primary Examiner—Howard W. Britton
Assistant Examiner—Mitchell Saffian
Attorney, Agent, or Firm—Lewis H. Eslinger; Alvin Sinderbrand

[57] ABSTRACT

In an apparatus for processing reproduced color video signals composed of a frequency-modulated luminance component and a frequency-converted chrominance component having its carrier frequency substantially below a standard frequency therefor; there are provided a drop-out compensating circuit responsive to a drop-out in the luminance component for inserting, in the interval of such drop-out, an earlier occurring portion of the luminance component, a frequency-converter receiving the chrominance component and a frequency-reconverting signal for restoring the carrier frequency to the standard frequency therefor, an automatic frequency control circuit (AFC) responsive to horizontal synchronizing signals separated from the luminance component after the drop-out compensation thereof so as to regulate the frequency-reconverting signal in the sense for removing time base errors from the reproduced color video signals, and a circuit which is responsive to a drop-out in the luminance component for maintaining the frequency of the frequency-reconverting signal at a previously determined value during the drop-out so that the automatic frequency control operation will not be adversely affected by the drop-out compensation.

15 Claims, 35 Drawing Figures

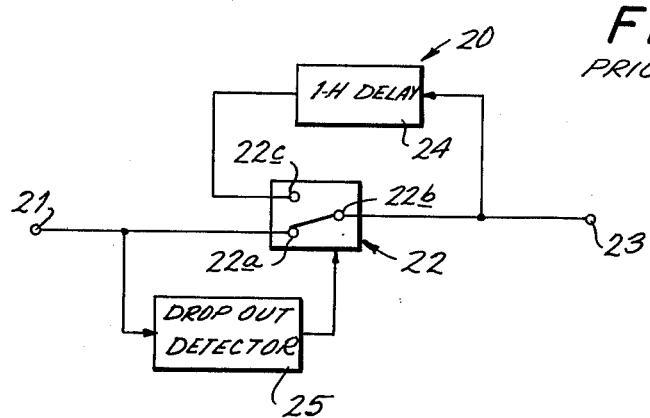
FIG. 3
PRIOR ART
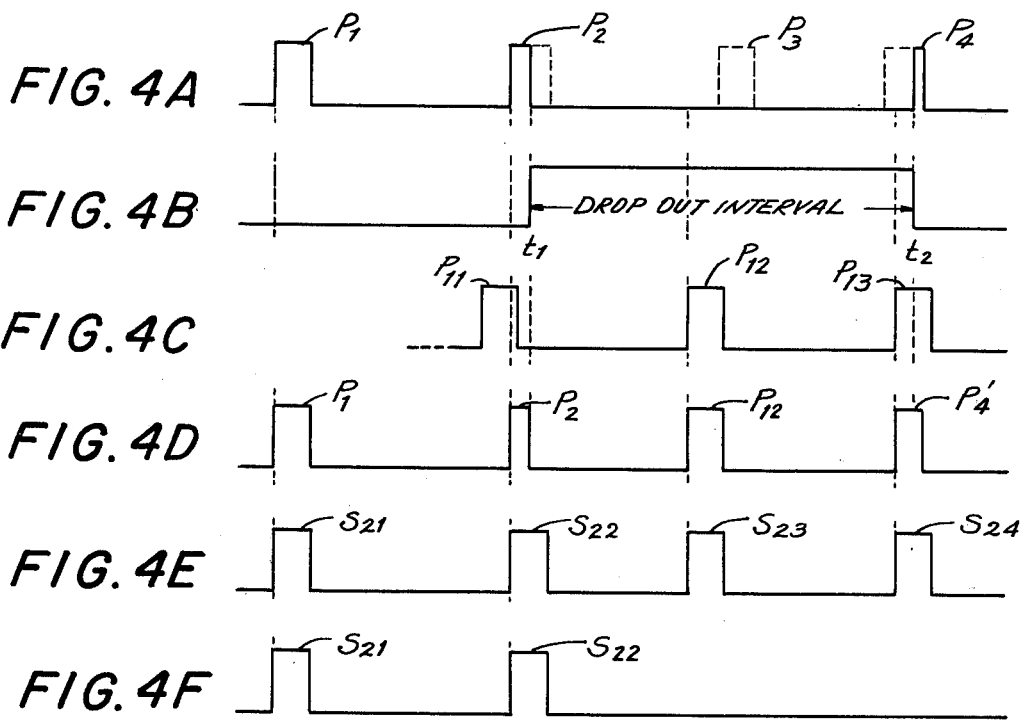

FIG. 6
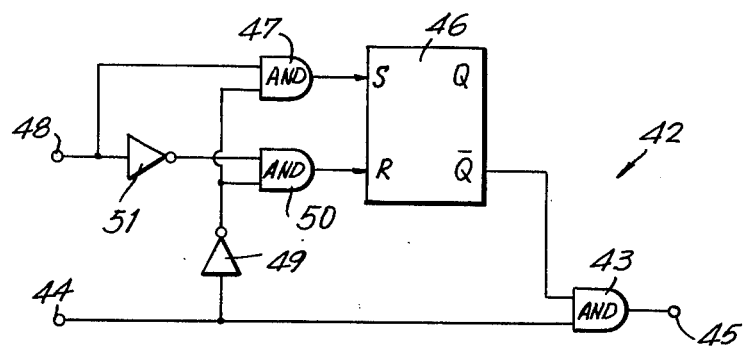
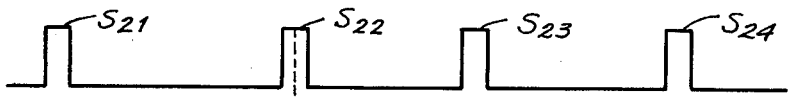
FIG. 7A
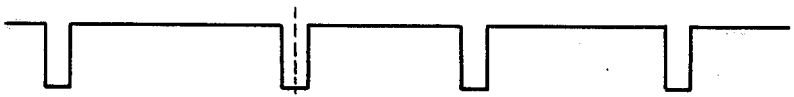
FIG. 7B
FIG. 7C (D)
FIG. 7D ($\bar{D}$)
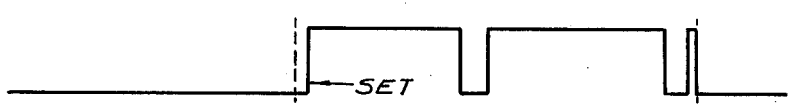
FIG. 7E
FIG. 7F
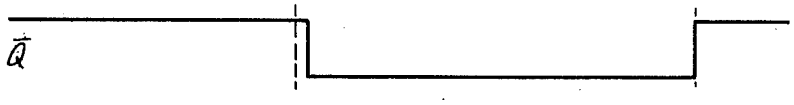
FIG. 7G $\bar{Q}$
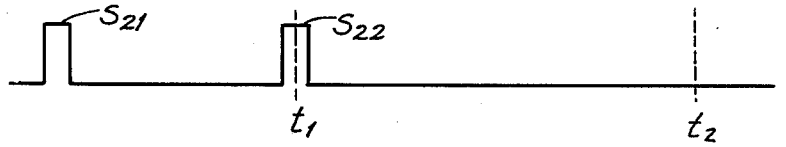
FIG. 7H

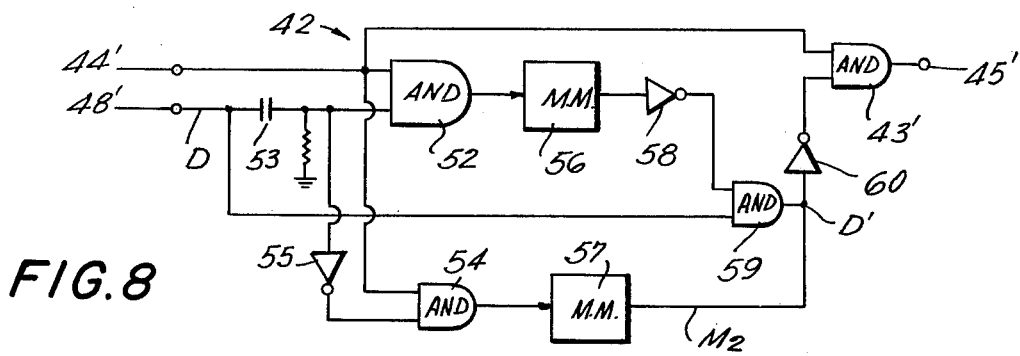
FIG.8
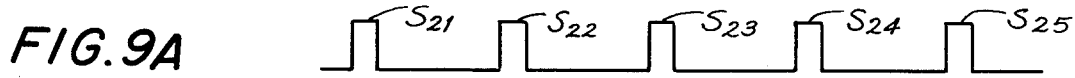
FIG.9A
FIG.9B
FIG.9C
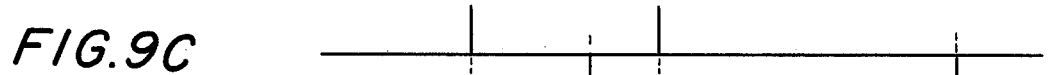
FIG.9D
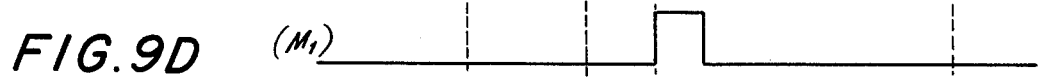
FIG.9E
FIG.9F
FIG.9G
FIG.9H
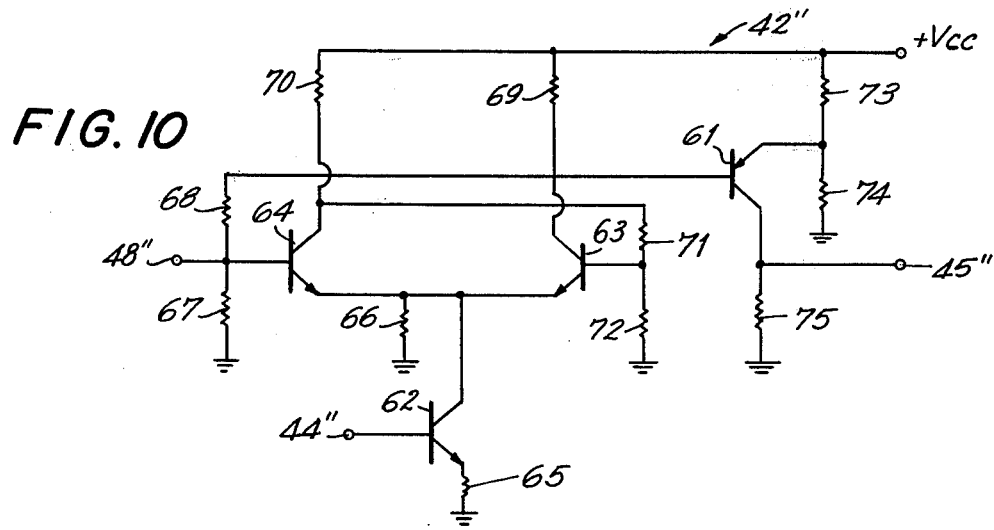
FIG.10

4,012,774

DROP-OUT RESPONSIVE COLOR VIDEO REPRODUCING APPARATUS

BACKGROUND OF THE INVENTION

1. Field of the Invention

This invention relates generally to apparatus for reproducing color video signals recorded, for example, on a magnetic tape, and more particularly is directed to an improved signal processing circuit for a color video signal reproducing apparatus.

2. Description of the Prior Art

It is known that, in recording a color video signal, the luminance component of the video signal is frequency-modulated to occupy a higher frequency band and the chrominance component has its carrier frequency-converted to occupy a lower frequency band below that of the frequency-modulated luminance component, whereupon the modulated luminance component and the converted chrominance component are combined to form a composite signal which is recorded on a magnetic tape. During reproducing, after the reproduced composite signal has been separated into the frequency-modulated luminance component and the frequency-converted chrominance component, on the basis of the frequency bands thereof, the luminance component is demodulated and the chrominance component is reconverted to the original or standard frequency band, and then both components are recombined to obtain the original color video signal. Such a magnetic recording and/or reproducing apparatus is usually provided with an automatic frequency control (AFC) circuit and an automatic phase control (APC) circuit for cancelling or correcting any time-based error included in the chrominance component of the reproduced composite signal. In the usual AFC circuit, horizontal synchronizing signals separated from the luminance component of the reproduced color video signal are compared with a suitably divided output of a voltage controlled variable frequency oscillator (VCO) to provide a control voltage by which the output frequency of the VCO is regulated, and the output of the VCO is employed as a frequency-reconverting signal by which the frequency-converted chrominance component of the reproduced color video signal has its carrier restored to a standard frequency, as in a frequency-converter.

Further, conventional color video signal recording and/or reproducing apparatus is usually provided with a dropout compensating circuit in its reproduced signal processing circuit. Such a drop-out compensating circuit is responsive to a drop-out in the luminance component of the reproduced color video signal for inserting in such luminance component, in the interval of the detected drop-out, an earlier occurring portion of the luminance component.

However, if the reproduced signal processing circuit or system of a color video signal recording and/or reproducing apparatus is provided with both a drop-out compensating circuit and an AFC circuit, as aforesaid, the horizontal synchronizing signals separated from a portion of the luminance component which has been compensated for drop-out, that is, in which an earlier occurring portion of the luminance component has been inserted, may not accurately correspond to the time-based error of the reproduced video signal and, accordingly, will disturb the operation of the AFV circuit so that a color image or picture formed on a color picture tube in response to the processed color video signals will be deteriorated.

OBJECTS AND SUMMARY OF THE INVENTION

Accordingly, it is an object of the present invention to provide a color video signal reproducing apparatus with a signal processing circuit which includes a drop-out compensating circuit and an automatic frequency control (AFC) circuit, as aforesaid, but in which the disturbance of the operation of the AFC circuit by reason of the drop-out compensation is avoided.

Another object is to provide a signal processing circuit for a color video signal reproducing apparatus which includes a drop-out compensating circuit and an AFC circuit, as aforesaid, and in which relatively simple means are employed for avoiding disturbance of the AFC operation by the drop-out compensation.

A further object is to provide a signal processing circuit for a color video signal reproducing apparatus which includes a drop-out compensating circuit and an AFC circuit controlled in response to horizontal synchronizing signals separated from the luminance component following its drop-out compensation for correcting time-based errors in the reproduced color video signal, and in which disturbance of the AFC operation by reason of the drop-out compensation is avoided by isolating the separated horizontal synchronizing signals from the AFC circuit during each drop-out interval.

Still another object is to provide a signal processing circuit for a color video signal reproducing apparatus as aforesaid, that is suitable for use with reproduced color video signals composed of a frequency-modulated luminance component and a chrominance component having its carrier frequency converted to a frequency substantially below the standard value therefor, and in which the luminance component is demodulated and the chrominance component has its carrier frequency reconverted to the standard value therefor in the signal processing circuit.

A still further object is to provide a signal processing circuit for a color video signal reproducing apparatus, as aforesaid, which is suitable for use where the chrominance component of the color video signal, as recorded and reproduced, has alternating different carrier frequencies during successive periods, for example, fields, of the color video signal, and the signal processing circuit is effective to minimize cross-talk on the basis of such different carrier frequencies.

In accordance with an aspect of this invention, an apparatus for reproducing color video signals composed of a frequency-modulated luminance component containing synchronizing pulse signals and a frequency-converted chrominance component having a carrier frequency substantially lower than a standard frequency therefor is provided with a reproduced signal processing circuit which comprises drop-out compensating means responsive to a drop-out in the luminance component of the reproduced color video signal for inserting, in the interval of such drop-out, an earlier occurring portion of the luminance component, means for separating the synchronizing pulse signals from the luminance component following the compensation of the latter by the drop-out compensating means, frequency-reconverting means including a frequency converter receiving the chrominance component of the reproduced color video signal, means for generating a frequency-reconverting signal which is applied to the frequency converter for causing the latter to restore the carrier frequency of said chrominance component to the standard frequency thereof, means for controlling the frequency of the frequency-reconverting signal in response to the separated synchronizing pulse signals, and means responsive to a drop-out in the luminance component for maintaining the frequency of the frequency-reconverting signal at a previously determined value during the drop-out.

In preferred embodiments of the invention, the means for generating the frequency-reconverting signal includes a voltage controlled oscillator (VCO), the means for controlling the frequency of the frequency-reconverting signal includes dividing means receiving the output of the VCO and providing a frequency-divided signal, and comparing means for comparing the frequency-divided signal with the separated synchronizing pulse signals to provide a corresponding control signal for the VCO, and said means for maintaining the frequency of said frequency-reconverting signal at a previously determined value during drop-out includes means for isolating the separated synchronizing pulse signals from the comparing means during drop-out, and hold means through which said control signal is applied from said comparing means to the VCO.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 3 is a block diagram of a known drop-out compensating circuit that has been used in an existing apparatus for reproducing color video signals;

FIGS. 4A–4F are waveform diagrams to which reference will be made in explaining the problems that arise when an apparatus for reproducing color video signals is provided with the known AFC circuit and drop-out compensating circuit of FIGS. 1 and 3, respectively;

FIG. 6 is a more detailed block diagram of one embodiment of a gate circuit which is included in the signal processing circuit of FIG. 5;

FIGS. 7A–7H are waveform diagrams to which reference will be made in explaining the operation of the gate circuit of FIG. 6;

FIG. 8 is a more detailed block diagram of another embodiment of the gate circuit which is included in the signal processing circuit of FIG. 5;

FIGS. 9A–9H are waveform diagrams to which reference will be made in explaining the operation of the gate circuit of FIG. 8; and FIG. 10 is a circuit diagram of still another embodiment of the gate circuit which is included in the signal processing circuit of FIG. 5.

DETAILED DESCRIPTION OF PREFERRED EMBODIMENTS OF THE INVENTION

Figure 1:
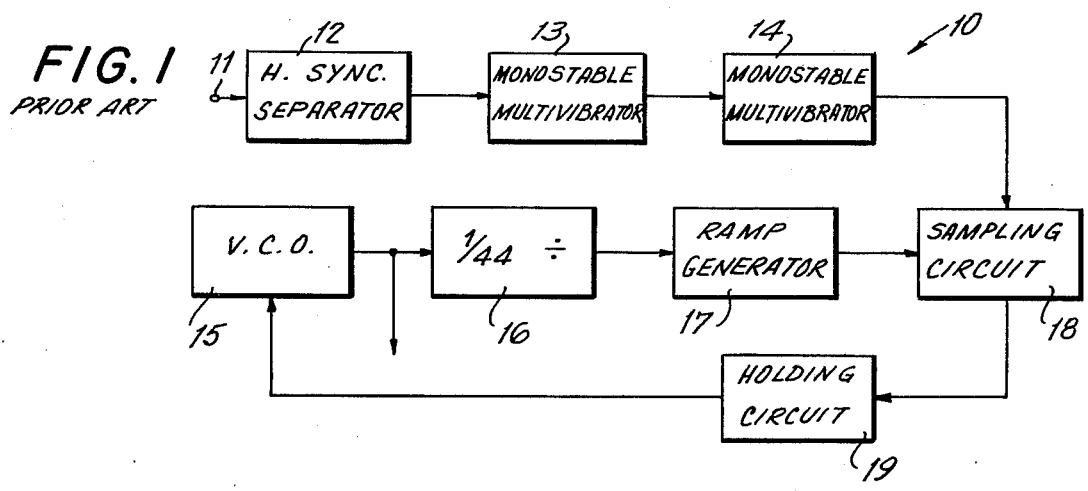
FIG. 1 is a block diagram of a known automatic frequency control (AFC) circuit of the type that is used in the signal processing circuit of an existing apparatus for reproducing color video signals.

Before referring to the drawings, mention is made of the fact that it is known, for example, as disclosed in detail in U.S. Pat. No. 3,730,983, issued May 1, 1973, and having a common assignee herewith, to magnetically record a composite color video signal by separating the luminance and chrominance components of such signal, whereupon, the luminance component is frequency modulated and the chrominance component is frequency shifted or converted to a lower frequency band so that the bands of the frequency-modulated luminance component and the frequency-converted chrominance component avoid substantial overlapping. The frequency-converted chrominance component is then added to the frequency-modulated luminance component to provide a combined or composite signal which is magnetically recorded on a tape or other record medium. Upon reproducing of the thus recorded combined or composite signal, the frequency-modulated luminance component and the frequency-converted chrominance component are separated from the reproduced combined signal on the basis of their respective frequency bands, whereupon the frequency-modulated luminance signal is demodulated and the frequency-converted chrominance component is passed to a frequency converter which also receives a suitable frequency-reconverting signal by which the carrier of the chrominance component is restored to the original or standard carrier frequency. Thereafter, the demodulated luminance component and the frequency-reconverted chrominance component are combined to reconstitute the color video signal.

When a color video signal is recorded and reproduced, as described above, time-based or frequency errors may be introduced in the reproduced signal. In order to compensate for such time-based errors, it is known to provide the reproducing apparatus with an automatic frequency control (AFC) circuit by which the frequency of the frequency-reconverting signal for restoring the carrier of the reproduced chrominance component to its original or standard frequency is adjusted in response to variations in the frequency of the horizontal synchronizing signals contained in the reproduced color video signal. For example, as shown on FIG. 1, in a known AFC circuit 10, the luminance component (FIG. 2A) of the reproduced color video signal is applied from an input terminal 11 to a separating circuit 12 by which the horizontal synchronizing signals or pulses (FIG. 2B) are separated therefrom. The horizontal synchronizing signals are applied from separating circuit 12 to a monostable multivibrator 13 which is triggered by the onset of each horizontal synchronizing signal to generate a pulse signal (FIG. 2C) having a relatively wide pulse width. The wide pulse signals from monostable multivibrator 13 are applied to a monostable multivibrator 14 which is triggered by the onset of each wide pulse signal from multivibrator 13 to generate a sampling pulse signal (FIG. 2D) having a relatively narrow pulse width. It will be seen that the sampling pulse signals (FIG. 2D) generally correspond to the separated horizontal synchronizing signals, and that the monostable multivibrator 13 is interposed between separating circuit 12 and monostable multivibrator 14 so as to ensure that the sampling pulse signals (FIG. 2D) will only be produced in response to the separated horizontal synchronizing signals, that is, to insure that a false sampling pulse signal will not occur when a noise pulse signal similar to a horizontal synchronizing signal is applied to the input terminal 11.

Figure 2A:
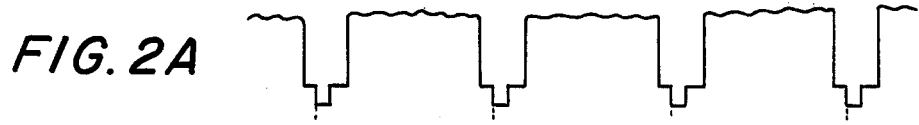
FIGS. 2A–2G are waveform diagrams to which reference will be made in explaining the operation of the AFC circuit of FIG. 1.
Figure 2B:
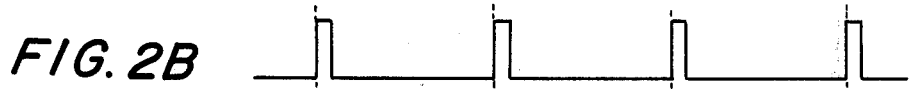
Figure 2C:
Figure 2D:
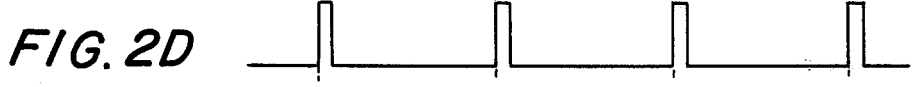
Figure 2E:
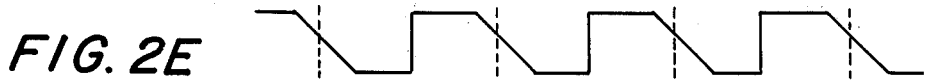
Figure 2F:
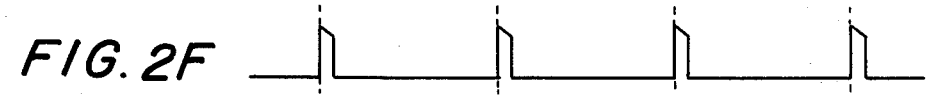
Figure 2G:
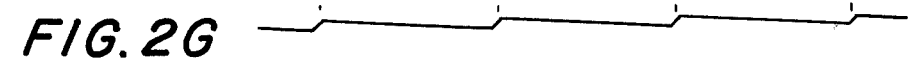

The known AFC circuit 10 is further shown to include a variable frequency or voltage controlled oscillator (VCO) 15 having a suitable center frequency, for example, equal to $44f_h$ (in which $f_h$ is the horizontal or line frequency). The output of oscillator 15 is applied to a frequency divider 16 in which the output of oscillator 5 is suitably frequency-divided, for example, by 44, so that the divided output from frequency divider 16 has the frequency $f_h$ when the output from oscillator 15 is at the center frequency of the latter. The divided output from frequency divider 16 is applied to a ramp or serrated signal generator 17 which produces a serrated signal (FIG. 2E) with a frequency equal to that of the divided output. The serrated signal from generator 17 is supplied to a sampling circuit 18 and is sampled in the latter by the sampling pulse signal (FIG. 2D) from monostable multivibrator 14 so as to obtain a sampled signal (FIG. 2F). Such sampled signal from circuit 18 is applied to a hold circuit 19 which provides a corresponding DC output signal or voltage (FIG. 2G) which is applied to the VCO 15 for controlling the frequency of the oscillating output from the latter. As a result of the foregoing, it will be apparent that the oscillating output from VCO 15 has its frequency controlled in correspondence with any time-based error included in the reproduced color video signal and may be supplied as the frequency-reconverting signal to the frequency converter (not shown) of the processing circuit for the chrominance component of the reproduced color video signal so as to compensate for the time-based error in restoring the carrier of the chrominance component to its original or standard carrier frequency.

In recording and reproducing a color video signal, as described above, it is further known to provide a drop-out compensating circuit in the processing circuit for the reproduced color video signal. More particularly, as shown on FIG. 3, in an existing drop-out compensating circuit 20, the separated luminance component of the reproduced color video signal is applied from an input terminal 21 to a first fixed terminal or contact 22a of a switching circuit 22 which has a movable contact 22b connected to an output terminal 23. The output of switching circuit 22 is recirculated from the movable contact 22b to a second fixed contact 22c through a delay line 24 having a delay time of one horizontal or line period. A detector 25 is also connected to the input terminal 21 and is operative to produce a drop-out signal when the detector 25 senses or detects a drop-out in the luminance component applied to terminal 21. Such drop-out signal is applied to switching circuit 22 for controlling the latter. Normally, that is, when a drop-out is not detected in the incoming luminance component, switching circuit 22 is in the condition shown on FIG. 3 so that the luminance component applied to terminal 21 is transmitted through engaged fixed contact 22a and movable contact 22b to output terminal 23 so as to be applied from the latter to the frequency-demodulator for the luminance component. However, when a drop-out is detected in the incoming luminance component, the resulting drop-out signal from detector 25 causes switching circuit 22 to switch over to the state or condition in which movable contact 22b is engaged with fixed contact 22c. In such switched condition of switching circuit 22, an earlier occurring portion of the luminance signal recirculated through delay line 24 is passed through engaged contacts 22b and 22c to the output terminal 23 so as to be inserted in the luminance component in place of the drop-out portion of the latter. Thus, a continuous luminance component appears at output terminal 23 so as to compensate for the drop-out, and such compensation will be effected even if the period of drop-out is greater than one horizontal period by reason of the fact that the luminance component appearing at the output of switching circuit 22 will be continuously recirculated through delay line 24.

In the conventional color video signal recording and/or reproducing apparatus having an AFC circuit 10 and a drop-out compensating circuit 20, as described above, the separating circuit 12 of the AFC circuit 10 for separating the horizontal synchronizing signals from the luminance component is operative on the latter after such luminance component has been acted upon by the drop-out compensating circuit. However, when the drop-out compensating circuit 20 is operative, in response to a detected drop-out in the luminance component, to insert in place thereof an earlier occurring portion of the luminance component, as described above, the horizontal synchronizing signal or signals separated from such compensated portion of the luminance component may not accurately reflect the time-based error in the reproduced color video signal. As a result of the foregoing, the operation of the AFC circuit 10 will be disturbed, with consequent deterioration of the color image resulting from the application of the reproduced color video signal to a color picture tube.

The nature of the foregoing problem will now be further described with reference to FIGS. 4A–4E. Assuming that the luminance component of a reproduced color video signal contains horizontal synchronizing pulses or signals as indicated at $P_1, P_2, P_3$ and $P_4$ (FIG. 4A), and that a drop-out occurs in such luminance component in the interval or period between the times $t_1$ and $t_2$ which respectively occur during the horizontal synchronizing pulses or signals $P_2$ and $P_4$. As a result of such drop-out, detector 25 (FIG. 3) will produce a drop-out signal (FIG. 4B) during the time interval $t_1$–$t_2$ to switch over switching circuit 22 with the result that the earlier occurring horizontal synchronizing pulse or signal $P_1$ is recirculated through delay line 24 with a delay of one horizontal period throughout the drop-out interval, for example, as indicated at $P_{11}, P_{12}$ and $P_{13}$ (FIG. 4C). Thus, the action of drop-out compensating circuit 20 will cause the luminance component appearing at its output terminal 23 to contain the horizontal synchronizing pulses or signals indicated at $P_1, P_2, P_{12}$ and $P'_4$ on FIG. 4D. It will be noted that the horizontal synchronizing signal $P_1$ during its first recirculation through delay line 24 with a delay of one horizontal period, as at $P_{11}$, terminates prior to the onset of the dropout interval so that, in the luminance component obtained at output terminal 23, the horizontal synchronizing signal $P_2$ (FIG. 4D) is unchanged from the corresponding horizontal synchronizing signal $P_2$ (FIG. 4A) in the incoming luminance component. Further, since the third recirculation of the horizontal synchronizing pulse or singal $P_1$ indicated at $P_{13}$ on FIG. 4C extends beyond the time $t_2$ of the conclusion of the drop-out interval, the horizontal synchronizing pulse or signal $P'_4$ in the compensated luminance component has a pulse width equal to the width of that portion of the pulse $P_{13}$ occurring prior to the time $t_2$ and the width of the original pulse $P_4$ occurring after the time $t_2$. If the compensated luminance component containing the horizontal synchronizing pulses or signals shown on FIG. 4D is applied to terminal 11 of the AFC circuit 10 so that the separating circuit 12 will separate therefrom the horizontal synchronizing pulses $P_1$, $P_2$, $P_{12}$ and $P'_4$, the monostable multivibrator 13, when triggered by the onset of each of those horizontal synchronizing pulses, will cause the monostable multivibrator 14 to generate the sampling pulse signals $S_{21}$, $S_{22}$, $S_{23}$ and $S_{24}$ (FIG. 4E). As is usually the case, at least the sampling pulse signals $S_{23}$ and $S_{24}$ do not correspond, in respect to the times of their occurrences, with the horizontal synchronizing pulses or signals $P_3$ and $P_4$, respectively, in the drop-out interval of the reproduced luminance component. In other words, the sampling pulse signals $S_{23}$ and $S_{24}$ do not accurately reflect the time-based errors in the reproduced color video signal so that, if the sampling pulse signals $S_{23}$ and $S_{24}$ are applied to the sampling circuit 18, the resulting sampled outputs will not correspond to the actual time-based error and the operation of the AFC circuit 10 will be disturbed. Therefore, in accordance with the present invention, the sampling pulse signals from monostable multivibrator 14 which correspond to horizontal synchronizing pulses or signals inserted in the luminance component by the operation of drop-out compensating circuit 20, for example, the sampling pulse signals $S_{23}$ and $S_{24}$ (FIG. 4E), are isolated from the sampling circuit 18, as shown on FIG. 4F.

Figure 5:
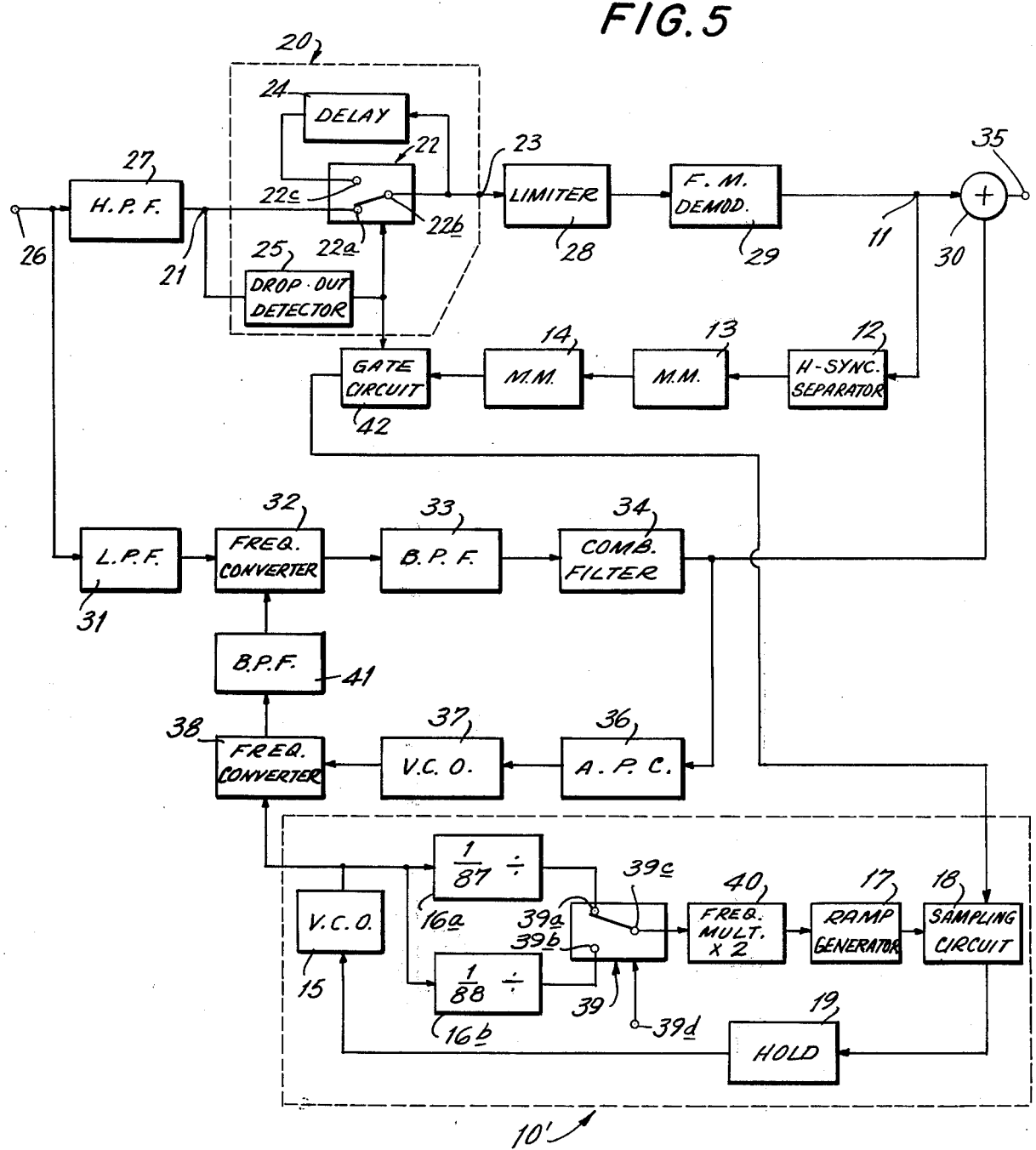
FIG. 5 is a block diagram showing a signal processing circuit according to this invention for use in a color video signal reproducing apparatus and which is provided with drop-out compensating, automatic frequency control (AFC) and automatic phase control (APC) circuits.

Referring now to FIG. 5, the present invention is there shown applied to the reproduced signal processing circuit of a recording and/or reproducing apparatus of a type disclosed in detail in pending U.S. Pat. application Ser. No. 634,668, filed Nov. 24, 1975, and having a common assignee herewith, and which is a continuation of U.S. Pat. application Ser. No. 492,330, filed July 26, 1974. In such apparatus, successive fields of the color video signals are recorded by rotary magnetic heads in respective successive parallel tracks extending obliquely across a magnetic tape. In preparing the color video signals for the recording thereof, the luminance component is frequency-modulated, as previously described, so as to occupy a relatively high-frequency portion of the available frequency band, and the rotary magnetic heads or transducers used for recording signals in adjacent tracks have gaps with different azimuth angles so that, when the successive tracks are scanned by rotary reproducing heads or transducers similarly having gaps with different azimuth angles, the well-known azimuth loss will substantially eliminate cross-talk interference in respect to the luminance component. More specifically, when one of the reproducing heads is scanning a particular track for reproducing the color video signal that was recorded therein with a head having a gap with the same azimuth angle, the simultaneous reproduction of the luminance component of the color video signal recorded in an adjacent track will be attenuated or substantially eliminated by the well-known azimuth loss. However, since the frequency component of the color video signal recorded in each of the tracks is frequency converted, as previously described, from a band around the normal chrominance carrier frequency, which in the case of an NTSC signal is approximately 3.58 MHz, to a relatively low frequency of about 600 to 700 KHz, and snce the azimuth loss is generally proportional to the frequency of the signals, the cross-talk interference due to the relatively low frequency-converted chrominance components is not sufficiently reduced by the use of recording and reproducing heads having gaps with different azimuth angles.

In order to reduce or eliminate cross-talk interference of the chrominance components of signals recorded in the adjacent tracks, the above identified recording and/or reproducing apparatus selectively frequency converts the chrominance component of the color video signal so as to record the same with first and second carriers having different frequencies in the adjacent tracks, respectively. Upon reproducing the color video signals thus recorded in adjacent tracks with such first and second carriers, respectively, for their chrominance components, the chrominance components of the color video signals reproduced from adjacent tracks are selectively frequency-reconverted to a common or standard carrier frequency by means of respective first and second frequency-reconverting signals which similarly have different frequencies selected so that, although the chrominance component reproduced from a particular track and reconverted to the standard carrier frequency will pass through a comb filter, the chrominance components of cross-talk signals simultaneously reproduced from adjacent tracks will be selectively reconverted by the first or second frequency-reconverting signal to have carrier frequencies at nodes of the comb filter so as to be blocked or eliminated by the latter. In the case where the comb filter is provided with a single delay line simply having a delay time of one horizontal or line period, the desired blocking or elimination of the chrominance components of the cross-talk signals can be achieved by providing the first and second carriers with which the chrominance component is recorded in adjacent tracks with carrier frequencies that differ from each other by one-half the horizontal or line frequency $f_h$. Thus, the described recording and/or reproducing apparatus, in reducing or eliminating cross-talk interference between the color video signals recorded in adjacent tracks makes it possible to dispose the successive parallel tracks in closely adjacent, abutting or even overlapping relation so as to increase the utilization of the tape for the recording of color video signals, as compared with the previously existing apparatus in which the successive parallel tracks had to be provided with guard bands of substantial width therebetween so as to avoid cross-talk interference when reproducing the signals recorded in such tracks.

As shown in FIG. 5, in a reproduced signal processing circuit according to this invention for a recording and-/or reproducing apparatus of the type described above, the color video signal reproduced by rotary heads or transducers is applied through an input terminal 26 to a high pass filter 27 by which the frequency-modulated luminance component of the reproduced color video signal is separated from the latter and applied to the input terminal 21 of the drop-out compensating circuit 20 described above with reference to FIG. 3. The resulting drop-out compensated luminance component appearing at the output terminal 23 of circuit 20 is applied to a limiter 28 which supplies a suitably amplitude-limited signal to a frequency demodulator 29 by which the frequency-modulated luminance component is demodulated, and the resulting luminance component is applied to a mixing or adding circuit 30.

The reproduced color video signal is further applied from input terminal 26 to a low pass filter 31 by which the frequency-converted chrominance component of the reproduced color video signal is separated therefrom. The separated frequency-converted chrominance component is supplied to a frequency converter 32 which has its output connected through a band pass filter 33 to a comb filter 34, and the output of such comb filter is connected to the mixing circuit 30 which, in turn, has its output connected to an output terminal 35.

The output of comb filter 34 is also applied to a conventional automatic phase control (APC) circuit 36 in which, for example, a fixed oscillator provides an output at the standard carrier frequency $f_s$ (3.58 MHz) and a phase comparator compares the phase of such fixed oscillator output with the phase of burst signals separated from the output of comb filter 34 to provide a resulting control signal. Such control signal from APC circuit 36 is used to control a variable frequency or voltage controlled oscillator (VCO) 37 so that the latter applies a phase-controlled signal to a frequency-converter 38. In the case where successive fields of color video signals are recorded in adjacent tracks $T_a$ and $T_b$ with their chrominance components having respective carrier frequencies $f_{ca}=(44-\frac{3}{4})f_h$ and $f_{cb}=(44-\frac{1}{4})f_h$, the phase-controlled output of VCO 37 applied to frequency converter 38 may have a frequency of $(f_s-\frac{1}{4}f_h)$.

As is further shown on FIG. 5, the reproduced signal processing circuit according to this invention also includes an automatic frequency control (AFC) circuit 10' which is generally similar to the AFC circuit 10 previously described with reference to FIG. 1, and in which the corresponding components are identified by the same reference numerals. However, in the AFC circuit 10', the VCO 15 is controlled, as hereinafter described, so that, during reproducing of a color video signal recorded in a track $T_a$ in which case the reproduced chrominance component has the carrier frequency $f_{ca}$, the oscillating output of VCO 15 will have the center frequency $f_{oa}=(44-\frac{1}{2})f_h$, and, during reproducing of a color video signal recorded in a track $T_b$ so that the reproduced chrominance component has the carrier frequency $f_{cb}$, the oscillating output of VCO 15 will have the center frequency $f_{ob}=44f_h$. As shown, in order to alternately obtain such different output frequencies from VCO 15, the divider 16 on FIG. 1 is replaced in AFC circuit 10' by two dividers 16a and 16b which are respectively operative to divide the output frequency of VCO 15 by 87 and 88. The frequency-divided output signals from dividers 16a and 16b are applied to fixed contacts 39a and 39b, respectively, of a switching circuit 39 which further has a movable contact 39c alternately engageable with the fixed contacts. The switching circuit 39 is suitably controlled by a switching signal applied to a terminal 39d and which is inverted at every field interval so that movable contact 39c engages fixed contact 39a during reproducing of a color video signal recorded in a track $T_a$, and movable contact 39c is changed over to engage fixed contact 39b during reproducing of a color video signal recorded in each track $T_b$. The output from switching circuit 39 is applied to the ramp or serrated signal generator 17 through a frequency multiplier 40 by which the frequency-divided output from divider 16a or from divider 16b, as the case may be, has its frequency multiplied by 2.

It will be apparent that the serrated signals produced by generator 17 in response to the signals from frequency multiplier 40 and the sampling pulse signals corresponding to horizontal synchronizing pulses or signals separated from the reproduced color video signals cause sampling circuit 18 and hold circuit 19 to control VCO 15 so as to provide the latter with the frequency-controlled output $f_{oa}$ during the reproducing of signals from each track $T_a$ and with the frequency-controlled output $f_{ob}$ during the reproducing of signals from each track $T_b$. Such oscillating outputs from VCO 15 are alternately added in frequency converter 38 to the output from VCO 37 to alternately produce the desired frequency-reconverting signals respectively having the frequency $f_s+(44-\frac{3}{4})f_h$ and the frequency $f_s+(44-\frac{1}{4})f_h$. Such frequency-reconverting signals are alternately applied to the frequency-converter 32 through a band pass filter 41.

The frequency-converter 32 is operative to subtract the carrier frequency of the chrominance component being applied thereto through low pass filter 31 from the frequency of the frequency-reconverting signal being simultaneously applied thereto through band pass filter 41. Thus, during each interval of reproducing the signal recorded in a track $T_a$ when the chrominance component $S'_c$ applied to frequency converter 32 has the carrier frequency $f_{ca}=(44-\frac{3}{4})f_h$, the frequency-reconverting signal applied to frequency-converter 32 has the frequency $f'_{oa}=f_s\times(44-\frac{3}{4})f_h$ so that the carrier frequency of the chrominance component of the color video signal recorded in each track $T_a$ is reconverted to the standard carrier frequency $f_s$ and the output signal $S_s$ from frequency converter 32 includes such original or standard carrier frequency and side bands spaced therefrom by integral multiples of the horizontal or line frequency $f_h$. Such frequency-reconverted chrominance signal $S_s$ passes through band pass filter 33 and comb filter 34 to the mixing circuit 30 where it mixes with the demodulated luminance signal to form a reconstituted composite video signal at the output terminal 35. On the other hand, at each interval when the chrominance component $S'_c$ separated from a color video signal reproduced from each track $T_b$, and hence having the carrier frequency $f_{cb}=(44-\frac{1}{4})f_h$, is applied to frequency-converter 32, the frequency-reconverting signal has the frequency $f'_{ob}=f_s\times(44-\frac{1}{4})f_h$ so that the outlet signal $S_s$ then issuing from frequency-converter 32 again includes the original or standard carrier frequency $f_s$ side bands spaced therefrom by integral multiples of the frequency $f_h$ so as to pass through band pass filter 33 and comb filter 34 to the mixing circuit 30. Thus, during the reproducing of color video signals recorded in the tracks $T_a$ and $T_b$, the chrominance components of such reproduced color video signals are frequency-reconverted to the standard carrier frequency for passage through comb filter 34 and mixing with the demodulated luminance signal.

If the successive tracks are recorded without guard bands therebetween so as to maximize the utilization of the magnetic tape for the recording of color video signals thereon, during the scanning of a track $T_a$ or $T_b$ by a magnetic head for reproducing the color video signal recorded in such track, the magnetic head simultaneously picks up or reproduces a cross-talk interference signal from the adjacent tracks $T_b$ or $T_a$, respectively. Thus, during the reproducing of a signal recorded in a track $T_a$ the chrominance component $S'_k$ of the cross-talk interference signal picked up from the adjacent tracks $T_b$ has the carrier frequency $f_{cb}$ and the frequency-reconverting signal then being applied to frequency-converter 32 has the frequency $f'_{oa}$, with the result that the chrominance component of the cross-talk interference signal is frequency-reconverted to have the carrier frequency $f_s-\frac{1}{2}f_h$. Similarly, during the reproducing of a color video signal recorded in a track $T_b$, the chrominance component of the cross-talk interference signal will have the carrier frequency $f_{ca}$, while the frequency-reconverting signal then being applied to frequency-converter 32 will have the frequency $f'_{ob}$, with the result that the chrominance component of the cross-talk interference signal will again be frequency-reconverted to have the carrier frequency $f_s-\frac{1}{2}f_h$. Such carrier frequency of the frequency-reconverted chrominance component of the cross-talk interference signal corresponds to a node in the response curve of the comb filter 34 and therefore will be greatly attenuated or blocked by the filter. Further, all of the side bands of the undesired frequency-reconverted chrominance component of the cross-talk interference signal will be at frequencies that are greatly attenuated by comb filter 34.

It will be seen that, in the reproduced signal processing circuit of FIG. 5, the sampling pulse signals for the sampling circuit 18 of the AFC circuit 10' are produced by the monostable multivibrator 14 in response to the separation by circuit 12 of horizontal synchronizing signals from the luminance component of the reproduced color video signals, as described above with reference to FIG. 1. More particularly, the horizontal synchronizing signal separator 12 is shown to have its input connected, as at 11, to the output of demodulator 29 so that separator 12 receives the luminance component after the latter has been subjected to the action of drop-out compensating circuit 20. As previously described with reference to FIG. 4, the application to sampling circuit 18 of sampling pulse signals corresponding to horizontal synchronizing signals which have been inserted in the luminance component by circuit 20 in compensating for a drop-out in the luminance component will disturb the operation of AFC circuit 10' in correcting time-based errors in the reproduced color video signal.

Accordingly, in the reproduced signal processing circuit according to this invention, as shown on FIG. 5, a normally open gate circuit 42 is interposed between monostable multivibrator 14 and sampling circuit 18 and is connected with drop-out detector 25 so that gate circuit 42 is closed in response to a drop-out signal from detector 25. Thus, during each drop-out interval, gate circuit 42 is closed to block the application to sampling circuit 18 of the sampling pulse signals produced by monostable multivibrator 14 in response to the inserted or undesired horizontal synchronizing signals. During such time as the gate circuit 42 is closed and, therefore, the serrated signal from generator 17 is not sampled in the sampling circuit 18, the control voltage or signal to the VCO 15 is held at its previously determined value by the hold circuit 19 with the result that a stable oscillating output will be obtained from VCO 15 even during the drop-out intervals of the reproduced color video signal.

Referring now to FIG. 6, it will be seen that, in accordance with one embodiment of this invention, the gate circuit 42 includes an AND circuit 43 functioning as a gate and having one input connected to a terminal 44 receiving the sampling pulse signals (FIG. 7A) from monostable multivibrator 14, while the output of AND circuit 43 is connected to an output terminal 45 from which the sampling pulse signals are applied to sampling circuit 18. In order to control AND circuit so as to close the latter in response to a drop-out signal from detector 25, the gate circuit 42 is further shown to include a flip-flop 46 having set and reset inputs S and R and an inverted output $\bar{Q}$ which is connected to a second input of AND circuit 43. An AND circuit 47 having its output connected to set input S of the flip-flop is provided with a first input connected to a terminal 48 which receives the drop-out signal D (FIG. 7C) from the detector 25, and the sampling pulse signals applied to terminal 44 are passed through an inverter 49 to obtain inverted sampling pulse signals (FIG. 7B) which are supplied to a second input of AND circuit 47. Another AND circuit 50 has its output connected to reset input R of flip-flop 46, and a first input of AND circuit 50 is connected through an inverter 51 with terminal 48 for receiving an inverted drop-out signal $\bar{D}$ (FIG. 7D), while a second input of AND circuit 50 is connected with inverter 49 for receiving the inverted sampling pulse signals from the latter.

It will be apparent that, in the gate circuit 42 of FIG. 6, the AND gate 43 is open for passing the sampling pulse signals to sampling circuit 18 only when the inverted output $\bar{Q}$ of flip-flop 46 (FIG. 7G) is at its high level, that is, only when flip-flop 46 is in its reset condition. Further, AND circuit 47 provides an output to set flip-flop 46, that is, to close AND gate 43, only when the onset of the drop-out signal D occurs in the absence of a sampling pulse signal, whereas AND circuit 50 provides an output for resetting flip-flop 46 only when the drop-out signal terminates in the absence of a sampling pulse signal. In other words, if the onset of the drop-out signal D (FIG. 7C) occurs at a time $t_1$ when a sampling pulse signal $S_{22}$ (FIG. 7A) is present, the corresponding inverted sampling pulse signal (FIG. 7B) applied to AND circuit 47 delays the onset of the output or set signal (FIG. 7E) from AND circuit 47 until the conclusion of the sampling pulse signal $S_{22}$. Conversely, if the drop-out signal terminates, that is, the inverted drop-out signal $\bar{D}$ rises to its high value (FIG. 7D), at a time when a sampling pulse signal is present, the low level of the corresponding inverted sampling pulse signal applied to AND circuit 50 delays the occurrence of the onset of the output or reset signal from AND circuit 50 until such time as the sampling pulse signal is concluded. Therefore, the inverted output $\bar{Q}$ (FIG. 7G) of the flip-flop 46 is controlled in response to the occurrences of the drop-out signals and sampling pulse signals so as to eliminate from the train of sampling pulse signals passed through AND gate 43 (FIG. 7H) those sampling pulse signals $S_{23}$ and $S_{24}$ (FIG. 7A) which correspond to horizontal synchronizing signals inserted by the operation of drop-out compensating circuit 20.

Referring now to FIg. 8, it will be seen that, in accordance with another embodiment of this invention, a gate circuit 42' that may be employed in place of the gate circuit 42 again includes an AND circuit 43' acting as a gate and having a first input connected to an input terminal 44' which receives the sampling pulse signals from monostable multivibrator 14, while the output of AND circuit 43' is connected to an output terminal 45' from which the sampling pulse signals are applied to sampling circuit 18. Further, as shown, an AND circuit 52 has a first input receiving the sampling pulse signals (FIG. 9A) from input terminal 44', while the drop-out signal D (FIG. 9B) from detector 25 is applied to an input terminal 48' and, from the latter, to a differentiating circuit 53 to produce a differentiated drop-out signal (FIG. 9C) which is applied to a second input of AND circuit 52. Another AND circuit 54 has a first input receiving the sampling pulse signals from input terminal 44', and a second input connected through an inverter 55 with the output of differentiating circuit 53 so as to receive an inverted differentiated drop-out signal. The outputs of AND circuits 52 and 54 are employed to trigger monostable multivibrators 56 and 57, respectively. The output $\bar{M}_1$ (FIG. 9D) of monostable multivibrator 56 is inverted, as by an inverter 58, so as to provide an inverted output $M_1$ (FIG. 9E) which is applied to a first input of an AND circuit 59, and a second input of such AND circuit 59 receives the drop-out D from input terminal 48'. The output of AND circuit 59 is combined with the output or pulse signal $M_2$ (FIG. 9F) from monostable multivibrator 57 so as to provide a combined signal D' (FIG. 9G), which is inverted, as by an inverter 60, to provide an inverted control or gating signal supplied to a second input of the AND gate of circuit 43'.

It will be apparent that, in the case of the drop-out signal occurring in the interval from $t_1$ to $t_2$, that is, commencing before the sampling pulse signal $S_{22}$ and terminating after such sampling pulse signal, the positive pulse of the differentiated drop-out signal occurring at the onset of the drop-out signal (FIG. 9C) is applied to AND circuit 52 in the absence of a sampling pulse signal so that there is no output from AND circuit 52 with the result that the inverted signal $\bar{M}_1$ (FIG. 9E) applied to the first input of AND circuit 59 is at a high level as is the drop-out signal applied to the second input of AND circuit 59. Thus, the output of AND circuit 59 rises up at the commencement of the drop-out signal to cause a similar rise in the combined signal D' (FIG. 9G). As a result of the inverter 60, the signal applied through the latter to AND gate 43' falls at the commencement of the drop-out signal, that is, at the time $t_1$, whereby to close AND gate 43' and block the transmission of the sampling pulse signal $S_{22}$ to the sampling circuit 18. At the termination of the drop-out signal, that is, at the time $t_2$, the output from AND circuit 59 drops to a low level as a result of the termination of the drop-out signal. Further, at such time, the positive pulse applied by inverter 55 to an input of AND circuit 54 in response to the negative pulse from differentiating circuit 53 corresponding to the termination of the drop-out signal occurs at a time when no sampling pulse signal is transmitted to AND circuit 54 from input terminal 44'. Thus, there is no output from AND circuit 54 so that the output $M_2$ (FIG. 9F) from multivibrator 57 remains at a low level. Thus, the combined signal D' (FIG. 9G) drops at the termination of the drop-out signal, that is, at the time $t_2$, with the result that the signal applied by inverter 60 to AND gate 43' is raised to prevent the subsequent transmission of sampling pulse signals from input terminal 44' to output terminal 45'.

In the event that a drop-out signal occurs in the interval between times $t_3$ and $t_4$ which respectively occur during the sampling pulse signals $S_{23}$ and $S_{25}$ (FIG. 9B), then, at the onset of such drop-out signal, there is an output from AND circuit 52 for triggering monostable multivibrator 56 to produce a pulse signal (FIG. 9D) with the result that a negative pulse signal (FIG. 9E) is applied from inverter 58 to AND circuit 59 for delaying the occurrence of a high output from AND circuit 59 for the duration of the pulse signal from multivibrator 56. Thus, the combined signal D' (FIG. 9G) only rises up at the completion of the pulse signal from multivibrator 56 with the result that the control signal from inverter 60 only drops to close AND gate 43' at the completion of the pulse signal from multivibrator 56. Thus, if the drop-out signal commences at the time $t_3$ during which the sampling pulse signal $S_{23}$ is occurring, the AND gate 43' is kept open for a predetermined time to permit the passage of such sampling pulse signal therethrough, as shown on FIG. 9H.

If the drop-out signal terminates at the time $t_4$ during the occurrence of the sampling pulse signal $S_{25}$, the resulting inverted differentiated drop-out signal applied to AND circuit 54 with the sampling pulse signal $S_{25}$ produces an output from AND circuit 54 for triggering monostable multivibrator 57 so that the latter produces a pulse signal $M_2$ (FIG. 9F) commencing at the time $t_4$. Thus, although the output from AND circuit 59 drops upon the termination of the drop-out signal at the time $t_4$, the high level condition of the combined output D' is extended by the pulse $M_2$ (FIG. 9G) with the result that AND gate 43' is maintained in its closed condition until the conclusion of the sampling of the pulse signal $S_{25}$.

Referring now to FIG. 10, it will be seen that a gating circuit 42" that may be used in place of the gating circuit 42 in accordance with another embodiment of this invention generally comprises a PNP-type output transistor 61, and NPN-type transistors 62, 63 and 64 which respectively function as an input transistor, a gating transistor and a control transistor. The gating and control transistors 63 and 64 have their emitters connected together to the collector of input transistor 62 which, in turn, has its emitter connected through a resistor 65 to ground. The connected together emitters of transistors 63 and 64 are further connected to ground through a resistor 66. The base of input transistor 62 is connected to an input terminal 44" which receives the sampling pulse signals from monostable multivibrator 14, while the base of control transistor 64 is connected to an input terminal 48" which receives the drop-out signal from detector 25. The base of control transistor 64 is further connected to ground through a resistor 67 and to the collector of gating transistor 63 through a resistor 68. The collector of gating transistor 63 is also connected to the base of output transistor 61, and the collectors of transistors 63 and 64 are connected through resistors 69 and 70, respectively, to a source of operating voltage $+V_{cc}$. The collector of control transistor 64 is further connected through a resistor 71 to the base of gating transistor 63 which is further connected to ground through a resistor 72. The emitter of output transistor 61 is shown to be connected to the operating voltage source by a voltage divider formed of resistors 73 and 74, while the collector of transistor 61 is connected to an output terminal 45" and through a resistor 75 to ground.

The above described gating circuit 42" operates as follows:

During normal operation, that is, when no dropout signal appears at terminal 48", control transistor 64 is non-conductive so that a relatively high voltage is applied through resistors 70 and 71 to the base of transistor 63 for causing the latter to be conductive. Thus, as the sampling pulse signals are applied from input terminal 44" to the base of input transistor 62 for causing the latter to be conductive periodically, the collector potential of transistor 63 which is applied to the base of transistor 61 is periodically decreased, in response to each sampling pulse signal, with the result that output transistor 61 is periodically made conductive in response to each sampling pulse signal for providing a corresponding signal at output terminal 45" for application to sampling circuit 18. Each such sampling pulse signal appearing at output terminal 45" is clipped at the emitter potential of output transistor 61.

If a drop-out signal applied to terminal 48" commences at a time between successive sampling pulse signals from monostable multivibrator 14, that is, at a time when input transistor 62 is non-conductive, the resulting high potential applied to the base of control transistor 64 makes the latter conductive and, in consequence thereof, the low collector potential of transistor 64 applied to the base of gating transistor 63 causes the latter to be non-conductive beginning with the commencement of such drop-out signal. However, if the drop-out signal commences during the occurrence of a sampling pulse signal, that is, when input transistor 62 is conductive to cause gating transistor 63 to have a low collector potential, such low collector potential is applied through transistor 68 to the base of control transistor 64 so that the latter is not made conductive by the drop-out signal until the occurring sampling pulse signal has been completed. On the other hand, if the drop-out signal applied to terminal 48" terminates at a time during the occurrence of a sampling pulse signal applied to the input terminal 44" so that input transistor 62 is conductive at the termination of the drop-out signal, the emitter impedance of control transistor 64 will be sufficiently lowered through connection of the emitter of transistor 64 to ground through the parallel circuit of resistor 66 and conductive transistor 62 so as to maintain control transistor 64 in its conductive state until such time as the sampling pulse signal is completed to make transistor 62 non-conductive. Thus, if the drop-out signal terminates during the occurrence of a sampling pulse signal, gating transistor 63 is held in its non-conductive state until the sampling pulse signal has been completed, whereby to prevent the delivery of such last mentioned sampling pulse signal from the output terminal 45".

From the foregoing, it will be apparent that the gating circuits 42' and 42" shown on FIGS. 8 and 10, as well as the gating circuit 42 of FIG. 6, are operative to prevent the transmission to the sampling circuit 18 on FIG. 5 of the sampling pulse signals which occur wholly within a drop-out interval or which commence prior to the termination of such drop-out interval, while permitting the transmission to the sampling circuit 18 of any sampling pulse signal which commences prior to the onset of the drop-out interval.

Having described specific embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for processing reproduced color video signals which are composed of a frequency-modulated luminance component containing synchronizing pulse signals and a frequency-converted chrominance component having a carrier frequency substantially lower than a standard frequency therefor, said apparatus comprising:
   drop-out compensating means responsive to a drop-out in said luminance component for inserting, in the interval of said drop-out, an earlier occurring portion of said luminance component;
   means for separating the synchronizing pulse signals from the luminance component following the compensation of the latter by said drop-out compensating means; and
   frequency-reconverting means including a frequency converter receiving said chrominance component, means for generating a frequency-reconverting signal which is applied to said frequency-reconverting means for causing the latter to restore the carrier frequency of said chrominance component to said standard frequency thereof, means for controlling the frequency of said frequency-reconverting signal in response to said separated synchronizing pulse signals, and means responsive to a drop-out in said luminance component for maintaining the frequency of said frequency-reconverting signal at a previously determined value during said drop-out.

2. An apparatus according to claim 1; in which said drop-out compensating means includes detecting means for producing a drop-out signal in response to a drop-out in said luminance component, switch means having a first input receiving said luminance component, a second input and an output, said switch means being controlled by said detecting means and having a normal condition in which the luminance component is passed from said first input to said output and a switched condition in response to said drop-out signal in which said second input is connected with said output, and delay means connected between said output and said second input of the switch means so that, in said interval of a drop-out, an earlier occurring portion of the luminance signal is recirculated through said delay means and from said second input to said output for insertion in the luminance component.

3. An apparatus according to claim 1; further comprising demodulating means for demodulating the frequency-modulated luminance component received from said drop-out compensating means; and in which said means for separating the synchronizing pulse signals is connected with the output of said demodulating means.

4. An apparatus according to claim 1; in which said frequency-converted chrominance component of the reproduced color video signals has alternating different carrier frequencies during successive periods of the color video signals, and the color video signal reproduced during each said period with its chrominance component having one of said carrier frequencies is mixed with a cross-talk signal including a chrominance component with the other of said carrier frequencies; in which a comb filter receives the output of said frequency converter to pass the chrominance component with said standard carrier frequency; and in which said means for generating the frequency-reconverting signal is operative to change the frequency of the latter for said successive periods of the reproduced color video signals so as to cause said frequency-converter to restore to said standard carrier frequency said alternating different carrier frequencies of the chrominance component of the reproduced color video signals for passage through the comb filter, while the carrier frequencies of the chrominance component in the corresponding cross-talk signals are converted to frequencies that are blocked by said comb filter.

5. An apparatus according to claim 4; in which said means for generating the frequency-reconverting signal includes a voltage controlled oscillator; said means for controlling the frequency of said frequency-reconverting signal includes first and second dividing means receiving the output of said oscillator and providing first and second frequency-divided signals, respectively, switching means alternately selecting said first and second frequency-divided signals in successive periods of the reproduced color video signals, and comparing means for comparing the selected frequency-divided signal with said separated synchronizing pulse signals to provide a corresponding control signal for said voltage controlled oscillator; and said means for maintaining the frequency of said frequency-reconverting signal at a previously determined value during said drop-out includes means for isolating said separated synchronizing pulse signals from said comparing means during said drop-out, and hold means through which said control signal is applied from said comparing means to said voltage controlled oscillator.

6. An apparatus according to claim 5; in which said drop-out compensating means includes detecting means providing a drop-out signal in response to a drop-out in said luminance component; and said means for isolating the separated synchronizing pulse signals from the comparing means includes gate means through which the separated synchronizing pulse signals are normally applied to said comparing means, and gate control means responsive to said drop-out signal from said detecting means for closing said gate means.

7. An apparatus according to claim 1; in which said means for generating the frequency-reconverting signal includes a voltage controlled oscillator; said means for controlling the frequency of said frequency-reconverting signal includes dividing means receiving the output of said oscillator and providing a frequency-divided signal, and comparing means for comparing said frequency-divided signal with said separated synchronizing pulse signals to provide a corresponding control signal for said voltage controlled oscillator; and said means for maintaining the frequency of said frequency-reconverting signal at a previously determined value during said drop-out includes means for isolating said separated synchronizing pulse signals from said comparing means during said drop-out, and hold means through which said control signal is applied from said comparing means to said voltage controlled oscillator.

8. An apparatus according to claim 7; in which said drop-out compensating means includes detecting means providing a drop-out signal in response to a drop-out in said luminance component; and said means for isolating the separated synchronizing pulse signals from the comparing means includes gate means through which the separated synchronizing pulse signals are normally applied to said comparing means, and gate control means responsive to said drop-out signal from said detecting means for closing said gate means.

9. An apparatus according to claim 8; in which said gate control means includes first and second AND gates each having a first input to which the separated synchronizing pulse signals are applied and a second input, differentiating means receiving said drop-out signal and providing a differentiated drop-out signal which is applied to said second input of said first AND gate, first inverting means through which said differentiated drop-out signal is applied to said second input of said second AND gate, first and second monostable-multivibrators respectively triggered by said first and second AND gates to provide respective first and second control pulses, second inverting means receiving said first control pulses to invert the latter, a third AND gate having a first input receiving the inverted first control pulses and a second input receiving said drop-out signal to provide an output which is combined with said second control pulses, and third inverting means receiving said output from the third AND gate which is combined with said second control pulses to provide an inverted combined control signal; and in which said gate means includes a fourth AND gate having first and second inputs which respectively receive said separated synchronizing pulse signals and said inverted combined control signal.

10. An apparatus according to claim 8; in which said gate means includes a gating transistor having an output circuit and a control electrode for receiving a control signal by which said output circuit is made conductive, an input transistor having an output circuit connected with said output circuit of said gating transistor and a control electrode receiving said separated synchronizing pulse signals so that the latter make the respective output circuit conductive, and an output transistor having an output circuit connected with an output terminal and a control electrode connected with said output circuit of said gating transistor to provide said separated synchronizing pulse signals at said output terminal when said gating transistor is conductive; and in which said gate control means includes a control transistor having a control electrode receiving said drop-out signal and an output circuit made conductive in response to said dropout signal and being connected with said control electrode of said gating transistor to apply said control signal to the latter when the output circuit of said control transistor is nonconductive, and feedback means from said output circuit of said gating transistor to said control electrode of said control transistor for permitting the output circuit of said control transistor to be made conductive at the onset of said drop-out signal only in the absence, at that time, of a separated synchronizing pulse signal at said control electrode of the input transistor.

11. An apparatus according to claim 10; in which said output circuit of the input transistor is also connected with said output circuit of the control transistor to hold the latter conductive at the termination of said drop-out signal so long as a separated synchronizing pulse signal is then being applied to said control electrode of the input transistor.

12. An apparatus according to claim 8; in which said gate control means includes means responsive to the presence of a separated synchronizing pulse signal at the initiation of said drop-out signal to delay the closing of said gate means until the conclusion of the separated synchronizing pulse signal.

13. An apparatus according to claim 12; in which said gate control means further includes means responsive to the presence of a separated synchronizing pulse signal at the termination of said drop-out signal to delay the reopening of said gate means until the conclusion of the last mentioned separated synchronizing pulse signal.

14. An apparatus according to claim 8; in which said gate control means includes a flip-flop having set and reset conditions and being connected with said gate means to open the latter only in said reset condition of the flip-flop, means receiving said drop-out signal and said separated synchronizing signals for establishing said set condition of the flip-flop in response to the occurrence of said drop-out signal in the absence of a separated synchronizing pulse signal, and means receiving said drop-out signal and said separated synchronizing pulse signals for establishing said reset condition of the flip-flop in response to the simultaneous absence of said drop-out signal and said separated synchronizing pulse signals.

15. An apparatus according to claim 14; in which said means for establishing the set condition of the flip-flop includes a first AND gate having a first input receiving said drop-out signal and a second input, and first inverting means through which said separated synchronizing pulse signals are applied to said second input of the first AND gate so that the latter provides an output for setting the flip-flop in response to the occurrence of said drop-out signal in the absence of a synchronizing pulse signal; and in which said means for establishing the reset condition of the flip-flop includes a second AND gate having a first input connected with said first inverting means and a second input, and second inverting means through which said drop-out signal is applied to said second input of the second AND gate so that the latter provides an output for resetting the flip-flop in response to the simultaneous absence of said drop-out signal and said synchronizing pulse signals.

* * * * *